United States Patent Office 2,801,238
Patented July 30, 1957

2,801,238

MANUFACTURE OF CELLULOSE ISOBUTYRATE

Carl J. Malm and Loring W. Blanchard, Jr., Rochester, N. Y., assignors to Eastman Kodak Company, Rochester, N. Y., a corporation of New Jersey No Drawing. Application June 7, 1954,
Serial No. 435,043

3 Claims. (Cl. 260—229)

This invention relates to a method for the manufacture of isobutyric acid esters of cellulose having an isobutyryl content of at least 25% and an intrinsic viscosity of at least 1.2 in which an activated cellulose is esterified with isobutyric anhydride using a perchloric acid catalyst and methylene chloride as the solvent.

The preparation of isobutyric acid esters of cellulose presents unusual difficulties because of the relative inactivity of isobutyric anhydride in reacting with cellulose. Also when such a reaction is catalyzed with mineral acids such as sulfuric acid or perchloric acid considerable breakdown of the cellulose may result before it has been sufficiently esterified to inhibit degradation. In previous procedures in which cellulose was esterified with isobutyric anhydride, cellulose isobutyrates of very low viscosity have resulted.

One object of our invention is to provide a method of preparing isobutyric acid esters of cellulose in which the cellulose is reacted upon with isobutyric anhydride using perchloric acid as the catalyst in which a product of good viscosity is obtained. Another object of our invention is to provide a procedure for preparing cellulose isobutyrates having an isobutyryl content of at least 25%. A further object of our invention is to provide a process for preparing cellulose isobutyrates in which methylene chloride is employed as the solvent in the esterification procedure. Other objects of our invention will appear herein.

We have found that cellulose isobutyrate of good viscosity and clarity can be obtained by esterifying cellulose with isobutyric anhydride using a perchloric acid catalyst if methylene chloride is employed as the solvent during the esterification and cellulose having an activity value of at least 0.2 is employed as the starting material. By this combination of features the high turbidities and/or very low viscosities of cellulose isobutyrates prepared with isobutyric anhydride and a mineral acid from a normally activated or unactivated cellulose as a starting material and isobutyric acid as the solvent are avoided.

The activation of the cellulose preliminary to its esterification is carried out to impart an activation value of at least 0.2 to the cellulose, this value being determined by the rate in ° C. per minute that one part of cellulose acetylates adiabatically with 10 parts of acetic anhydride in 20 parts of acetic acid starting at 20° C. and using 0.072 mol of sulfuric acid catalyst per 100 grams of cellulose. This method of determining activation value of cellulose and methods of activating which will result in cellulose activated to that degree are described in an article by Malm et al. in Industrial and Engineering Chemistry, December 1952, vol. 44, page 1904. The activated cellulose which is employed in accordance with our invention should desirably have a cuprammonium viscosity of at least 1000 cps.

The preferred method of activating cellulose for the preparation of isobutyric acid esters in accordance with our invention involves treating the cellulose with water followed by displacing the water from the cellulose with acetic acid and then removing the acetic acid therefrom by means of isobutyric acid. An activation of this type is described and claimed in U. S. Patent No. 2,622,080 of Richter et al. It is to be understood however that other methods of activating cellulose which will impart an activation value of 0.2 without substantially degrading the cellulose are useful in preparing cellulose for esterification in accordance with our invention. One such activation method involves treating cellulose with 10% aqueous sodium hydroxide solution followed by washing the cellulose with water, removing the water from the cellulose with acetic acid and removing the acetic acid with isobutyric acid. Still another method of activating cellulose is carried out by treating the cellulose with 70% aqueous acetic acid followed by removal of the acetic acid with isobutyric acid. In any method employed for activating cellulose the treating materials are desirably removed from the cellulose with isobutyric acid or with methylene chloride prior to the esterification proper.

After the cellulose has been activated and while still wet with the isobutyric acid or methylene chloride it is mixed with isobutyric anhydride, methylene chloride and perchloric acid catalyst in such proportion that there is at least 6 parts of liquid (preferably at least 8 parts) present per part of cellulose. The esterifying anhydride should be equivalent to at least 4 parts of isobutyric anhydride per part of cellulose and at least 60% of the total of the fatty acid compounds present should be isobutyric anhydride. The proportion of perchloric acid catalyst which is employed should be ½–3% of the weight of cellulose. If desired 0–1 parts of phosphoric acid may be employed per part of perchloric acid as an auxiliary thereto to facilitate the esterification operations. The esterification may be either carried out without any other acyl groups than isobutyryl in the esterification mass or the operator may, if desired, include a small proportion of lower fatty acid compounds such as propionic acid or anhydride, normal butyric acid or anhydride or acetic acid or anhydride in proportions less than 30% of the acid-anhydride mixture in the esterification bath.

In the carrying out of the esterification methylene chloride is employed in sufficient proportion to assure good fluidity in the esterification mass. For instance, the methylene chloride may be used in an amount from 1 to 8 times the amount of cellulose which is employed, being employed in the larger proportions as smaller proportions of lower fatty acid are present. In the carrying out of the reaction it is desirable to cool the reaction mass such as by means of a water jacket although if desired the methylene chloride may be completely depended upon for its cooling effect on the esterification mass. The reaction vessel may be fitted with a reflux condenser so that any methylene chloride which evaporates during the esterification may be condensed and returned to the reaction mass.

The reaction ordinarily is run at a temperature of 50–75° F. As the reaction occurs at a comparatively rapid rate, cooling such as by means of a water jacket is desirable although the methylene chloride will act by evaporation to prevent the temperature from exceeding approximately 100° F. It is desirable to carry out the esterification as described herein at a temperature which does not substantially exceed 100° F.

The following examples illustrate our invention:

*Example 1*

300 parts of cotton linters, activated by soaking for a half hour in hot water, were centrifuged to remove the water, immersed in acetic acid, centrifuged, immersed in isobutyric acid and centrifuged. The resulting mass consisting of 300 parts of cotton linters and 230 parts of isobutyric acid was placed in a Werner-Pfleiderer mixer together with 1300 parts of isobutyric anhydride and 1200 parts of methylene chloride and the whole was cooled to 24° F. 3 parts of 72% perchloric acid was slowly added which started the reaction and the mixer was run using a water jacket temperature of 50° F. The reaction temperature stayed within the range of 56–72° F. After running the reaction for 2 hours and 10 minutes the reaction was complete and the cellulose had completely dissolved. There was added to the mass a mixture of 50 parts of distilled water, 200 parts of acetic acid and 3.4 parts of sodium acetate. The cellulose isobutyrate formed was separated from the mass by precipitating in water. The washed and dried product had an intrinsic viscosity of 1.20 in acetic acid.

*Example 2*

300 parts of cotton linters were activated in the same manner as described in the preceding example so as to result in a mixture of 300 parts of activated cotton linters and 230 parts of isobutyric acid. The cellulose mass was loaded into a small Werner-Pfleiderer mixer with 1300 parts of isobutyric anhydride and 1200 parts of methylene chloride at 56° F. to which mass was also added a mixture of 25 parts of isobutyric acid, 9 parts of 85% phosphoric acid and 3 parts of 72% perchloric acid. The temperature of the water jacket was maintained at 50° F. and the esterification temperature remained at 59–62° F. for 2½ hours. After 3¼ hours the temperature rose to 71° F. and the reaction was finished after 4 hours. The cellulose isobutyrate obtained was precipitated in water, washed and dried. It was found to have an intrinsic viscosity in acetic acid of 1.46.

We claim:

1. A method of preparing isobutyric acid esters of cellulose which comprises treating cellulose with water, removing the water with acetic acid and the acetic acid with isobutyric acid and reacting upon the so-activated cellulose wet with isobutyric acid with an esterification bath comprising isobutyric anhydride, methylene chloride and perchloric acid so constituted that the liquid to cellulose ratio is at least 6:1, the esterifying anhydride is at least the equivalent of 4 parts of isobutyric anhydride per part of cellulose and the isobutyric anhydride is at least 60% of the fatty acid compounds present and the perchloric acid is ½–3% based on the weight of the cellulose whereby a cellulose isobutyrate having an isobutyryl content of at least 25% and an intrinsic viscosity of at least 1.2 is obtained.

2. A method of preparing isobutyric acid esters of cellulose which comprises treating cellulose with water, removing the water with acetic acid and the acetic acid with methylene chloride and reacting upon the so-activated cellulose wet with methylene chloride with an esterification bath comprising isobutyric anhydride, methylene chloride and perchloric acid so constituted that the liquid to cellulose ratio is at least 6:1, the isobutyric anhydride is at least 60% of the fatty acid compounds present, the esterifying anhydride is at least the equivalent of 4 parts of isobutyric anhydride per part of cellulose and the perchloric acid is ½–3% based on the weight of the cellulose whereby a cellulose isobutyrate having an isobutyryl content of at least 25% and an intrinsic viscosity of at least 1.2 is obtained.

3. A method of preparing isobutyric acid esters of cellulose which comprises treating cellulose with hot water, removing the water with acetic acid and the acetic acid with isobutyric acid and reacting the so-activated cellulose wet with isobutyric acid with an esterification bath comprising isobutyric anhydride, methylene chloride and perchloric acid so constituted that the liquid to cellulose ratio is at least 6:1, the esterifying anhydride is equivalent to at least 4 parts of isobutyric anhydride per part of cellulose, the isobutyric anhydride is at least 60% of the fatty acid compounds present and the perchloric acid is ½–3% based on the weight of the cellulose whereby a cellulose isobutyrate having an isobutyryl content of at least 25% and an intrinsic viscosity of at least 1.2 is obtained.

References Cited in the file of this patent

UNITED STATES PATENTS

| | | |
|---|---|---|
| 2,543,191 | Neilson et al. | Feb. 27, 1951 |
| 2,622,080 | Richter et al. | Dec. 16, 1952 |